United States Patent
Bourai et al.

(10) Patent No.: US 11,838,211 B2
(45) Date of Patent: *Dec. 5, 2023

(54) SYSTEM AND METHOD TO DETERMINE OPTIMAL PATH(S) AND USE LOAD BALANCING IN AN INTERCONNECT

(71) Applicant: ARTERIS, INC., Campbell, CA (US)

(72) Inventors: Youcef Bourai, Santa Clara, CA (US); Syed Ijlal Ali Shah, Austin, TX (US); Khaled Labib, San Jose, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,359

(22) Filed: Jul. 27, 2022

(65) Prior Publication Data

US 2022/0368637 A1 Nov. 17, 2022

Related U.S. Application Data

(63) Continuation of application No. 16/845,056, filed on Apr. 9, 2020, now Pat. No. 11,418,448.

(51) Int. Cl.
*H04L 47/125* (2022.01)
*H04L 45/121* (2022.01)
(Continued)

(52) U.S. Cl.
CPC .......... *H04L 47/125* (2013.01); *H04L 45/121* (2013.01); *H04L 45/128* (2013.01); *H04L 45/24* (2013.01)

(58) Field of Classification Search
CPC ... H04L 47/125; H04L 45/121; H04L 45/128; H04L 45/24; H04L 45/12; H04L 49/109
See application file for complete search history.

(56) References Cited

U.S. PATENT DOCUMENTS 5,485,396 A 1/1996 Brasen et al.
5,541,849 A 7/1996 Rostoker et al.
(Continued)

FOREIGN PATENT DOCUMENTS

CN 105187313 B 5/2018
CN 109587081 A 4/2019
(Continued)

OTHER PUBLICATIONS

"A distributed interleaving scheme for efficient access to wideIO dram memory", Seiculescu Ciprian, Benini Luca, De Micheli Giovanni, CODES+ISSS'12 (Year: 2012).

(Continued)

*Primary Examiner* — Atique Ahmed
(74) *Attorney, Agent, or Firm* — DANA LEGAL SERVICES; Jubin Dana

(57) ABSTRACT

A system, and corresponding method, is described for finding the optimal or the best set of routes from a master to each of its connected slaves, for all the masters and slaves using an interconnect, such as a network-on-chip (NoC). Some embodiments of the invention apply to a class of interconnects that utilize a two-dimensional mesh topology, wherein a set of switches are arranged on a two-dimensional grid. Masters (initiators or sources) inject data packets or traffic into the interconnect. Slaves (targets or destinations) service the data packets or traffic traveling through the interconnect. The interconnect includes switches and links that are part of a path. Additionally, one or more optimal routes, which is defined by the system, move the traffic in a way that avoids deadlock scenarios.

14 Claims, 6 Drawing Sheets

(51) Int. Cl.
*H04L 45/24* (2022.01)
*H04L 45/128* (2022.01)

(56) References Cited

U.S. PATENT DOCUMENTS

| | | | |
|---|---|---|---|
| 5,623,420 A | 4/1997 | Yee et al. | |
| 5,638,288 A | 6/1997 | Deeley | |
| 5,761,078 A | 6/1998 | Fuller et al. | |
| 5,887,670 A * | 3/1999 | Tabata | B60K 6/48 |
| | | | 903/910 |
| 5,903,886 A | 5/1999 | Heimlich et al. | |
| 5,983,277 A | 11/1999 | Heile et al. | |
| 6,002,857 A | 12/1999 | Ramachandran | |
| 6,134,705 A | 10/2000 | Pedersen et al. | |
| 6,145,117 A | 11/2000 | Eng | |
| 6,249,902 B1 | 6/2001 | Igusa et al. | |
| 6,321,363 B1 | 11/2001 | Huang et al. | |
| 6,360,356 B1 | 3/2002 | Eng | |
| 6,378,121 B2 | 4/2002 | Hiraga | |
| 6,421,321 B1 * | 7/2002 | Sakagawa | H04L 45/10 |
| | | | 370/238.1 |
| 6,437,804 B1 | 8/2002 | Ibe et al. | |
| 6,449,761 B1 | 9/2002 | Greidinger et al. | |
| 6,622,225 B1 | 9/2003 | Kessler et al. | |
| 6,883,455 B2 | 4/2005 | Maeda et al. | |
| 6,907,591 B1 | 6/2005 | Teig et al. | |
| 7,096,436 B2 | 8/2006 | Bednar et al. | |
| 7,398,497 B2 | 7/2008 | Sato et al. | |
| 7,587,687 B2 | 9/2009 | Watanabe et al. | |
| 7,788,625 B1 | 8/2010 | Donlin et al. | |
| 8,042,087 B2 | 10/2011 | Murali et al. | |
| 8,302,041 B1 | 10/2012 | Chan et al. | |
| 8,819,611 B2 | 8/2014 | Philip et al. | |
| 9,184,998 B2 * | 11/2015 | Xue | H04L 41/0654 |
| 9,262,359 B1 | 2/2016 | Noice et al. | |
| 9,444,702 B1 | 9/2016 | Raponi et al. | |
| 9,569,574 B1 | 2/2017 | Khan et al. | |
| 9,792,397 B1 | 10/2017 | Nagaraja | |
| 9,825,779 B2 | 11/2017 | Ruymbeke et al. | |
| 9,940,423 B2 | 4/2018 | Lescure | |
| 10,068,047 B1 | 9/2018 | Finn | |
| 10,282,502 B1 | 5/2019 | BShara et al. | |
| 10,348,563 B2 | 7/2019 | Rao et al. | |
| 10,460,062 B2 | 10/2019 | Feld et al. | |
| 10,733,350 B1 | 8/2020 | Prasad et al. | |
| 17,134,384 | 12/2020 | Angiolini | |
| 10,922,471 B2 | 2/2021 | Baeckler et al. | |
| 10,990,724 B1 | 4/2021 | Cherif et al. | |
| 11,121,933 B2 | 9/2021 | Cherif et al. | |
| 17,665,578 | 2/2022 | Janac | |
| 11,281,827 B1 | 3/2022 | Labib et al. | |
| 11,449,655 B2 | 9/2022 | Cherif et al. | |
| 2003/0093765 A1 | 5/2003 | Lam et al. | |
| 2004/0040007 A1 | 2/2004 | Harn | |
| 2004/0230919 A1 | 11/2004 | Balasubramanian et al. | |
| 2005/0073316 A1 | 4/2005 | Graham | |
| 2005/0268258 A1 | 12/2005 | Decker | |
| 2007/0156378 A1 | 7/2007 | McNamara | |
| 2007/0157131 A1 | 7/2007 | Watanabe et al. | |
| 2007/0174795 A1 | 7/2007 | Lavagno et al. | |
| 2007/0186018 A1 | 8/2007 | Radulescu et al. | |
| 2008/0046854 A1 | 2/2008 | Tang | |
| 2008/0049753 A1 | 2/2008 | Heinze et al. | |
| 2008/0279183 A1 | 11/2008 | Wiley et al. | |
| 2008/0291826 A1 | 11/2008 | Licardie et al. | |
| 2009/0031277 A1 | 1/2009 | Mcelvain et al. | |
| 2009/0313592 A1 | 12/2009 | Murali et al. | |
| 2010/0061352 A1 * | 3/2010 | Fasolo | H04L 45/121 |
| | | | 370/352 |
| 2010/0162189 A1 | 6/2010 | Lavagno et al. | |
| 2010/0218146 A1 | 8/2010 | Platzker et al. | |
| 2010/0274785 A1 | 10/2010 | Procopiuc et al. | |
| 2011/0170406 A1 | 7/2011 | Krishnaswamy | |
| 2012/0013509 A1 | 1/2012 | Wisherd et al. | |
| 2012/0311512 A1 | 12/2012 | Michel et al. | |
| 2013/0174113 A1 | 7/2013 | Lecler et al. | |
| 2013/0208598 A1 * | 8/2013 | Nakaya | H04W 28/0236 |
| | | | 370/237 |
| 2013/0258847 A1 * | 10/2013 | Zhang | H04L 47/822 |
| | | | 370/232 |
| 2013/0283226 A1 | 10/2013 | Ho et al. | |
| 2014/0115218 A1 | 4/2014 | Philip et al. | |
| 2014/0126572 A1 | 5/2014 | Hutton et al. | |
| 2014/0153575 A1 | 6/2014 | Munoz | |
| 2014/0160939 A1 | 6/2014 | Arad et al. | |
| 2014/0169173 A1 * | 6/2014 | Naouri | H04L 47/122 |
| | | | 370/237 |
| 2014/0204735 A1 | 7/2014 | Kumar et al. | |
| 2014/0211622 A1 * | 7/2014 | Kumar | H04L 47/70 |
| | | | 370/235 |
| 2014/0298281 A1 | 10/2014 | Varadarajan et al. | |
| 2014/0321839 A1 * | 10/2014 | Armstrong | F24H 15/254 |
| | | | 392/498 |
| 2015/0036536 A1 | 2/2015 | Kumar et al. | |
| 2015/0106778 A1 | 4/2015 | Mangano et al. | |
| 2015/0178435 A1 | 6/2015 | Kumar | |
| 2015/0254325 A1 | 9/2015 | Stringham | |
| 2015/0341224 A1 | 11/2015 | Van et al. | |
| 2015/0347641 A1 | 12/2015 | Gristede et al. | |
| 2016/0103943 A1 | 4/2016 | Xia et al. | |
| 2016/0275213 A1 | 9/2016 | Tomita | |
| 2017/0060204 A1 | 3/2017 | Gangwar et al. | |
| 2017/0063734 A1 | 3/2017 | Kumar | |
| 2017/0132350 A1 | 5/2017 | Janac | |
| 2017/0177778 A1 | 6/2017 | Lescure | |
| 2017/0193136 A1 | 7/2017 | Prasad et al. | |
| 2018/0115487 A1 * | 4/2018 | Thubert | H04L 65/60 |
| 2018/0144071 A1 | 5/2018 | Yu et al. | |
| 2018/0227180 A1 | 8/2018 | Rao et al. | |
| 2019/0012909 A1 * | 1/2019 | Mintz | G08G 1/0112 |
| 2019/0073440 A1 | 3/2019 | Farbiz et al. | |
| 2019/0205493 A1 | 7/2019 | Garibay et al. | |
| 2019/0246989 A1 | 8/2019 | Genov et al. | |
| 2019/0251227 A1 | 8/2019 | Fink | |
| 2019/0260504 A1 * | 8/2019 | Philip | H04L 1/0041 |
| 2019/0363789 A1 | 11/2019 | Lee et al. | |
| 2020/0092230 A1 | 3/2020 | Schultz et al. | |
| 2020/0162335 A1 | 5/2020 | Chen et al. | |
| 2020/0234582 A1 * | 7/2020 | Mintz | G08G 1/0145 |
| 2020/0366607 A1 | 11/2020 | Kommula et al. | |
| 2021/0203557 A1 | 7/2021 | Cherif et al. | |
| 2021/0320869 A1 | 10/2021 | Bourai et al. | |
| 2021/0409284 A1 | 12/2021 | Cherif et al. | |
| 2022/0294704 A1 | 9/2022 | Lescure et al. | |

FOREIGN PATENT DOCUMENTS

| | | | |
|---|---|---|---|
| CN | 113051215 A | 6/2021 | |
| CN | 113055219 A | 6/2021 | |
| DE | 102015014851 A1 | 5/2016 | |
| EP | 3842987 A1 | 6/2021 | |
| EP | 4024262 A1 | 7/2022 | |
| EP | 4057179 A1 | 9/2022 | |

OTHER PUBLICATIONS

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conference Alberto Ghiribaldi, Hervé Tatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.

ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.

Alessandro Pinto et al, "System level design paradigms", ACM Transactions on Design Automation of Electronic Systems, ACM, New York, NY, US, (Jun. 7, 2004), vol. 11, No. 3, doi:10.1145/1142980.1142982, ISSN 1084-4309, pp. 537-563, XP058222500.

(56) References Cited

OTHER PUBLICATIONS

Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.
Bo Huang et al, "Application-Specific Network-on-Chip synthesis with topology-aware floorplanning", Integrated Circuits and Systems Design (SBCCI), 2012 25th Symposium on, IEEE, (Aug. 30, 2012), doi:10.1109/SBCCI.2012.6344421, ISBN 978-1-4673-2606-3, pp. 1-6, XP032471227.
David Atienza et al., Network-on-Chip Design and Synthesis Outlook, Science Direct, INTEGRATION the VLSI, journal 41 (2008) 340-359.
Dumitriu Vet Al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.
Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 abstract* * p. 426-p. 429 *.
Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].
Jean-Jacques Lecler et al: Application driven network-on-chip architecture exploration & refinement for a complex SoC, Design Automation for Embedded Systems, vol. 15 No. 2, Apr. 7, 2011, DOI: 10.1007/S10617-011-9075-5.
K. R. Manik et al., "Methodology for Design of Optimum NOC Based on I PG," 2017 Int'l Conference on Algorithms, Methodology, Model and Applications in Emerging Technologies (ICAMMAET), Chennai, India, IEEE, 6 pages. (Year: 2017).
Luca Benini: "Application specific Noc design", Design, Automation and Test in Europe, 2006, Date '06 : Mar. 6-10, 2006, [Munich, Germany; Proceedings] / [Sponsored by the European Design and Automation Association], IEEE, Piscataway, NJ, USA, Mar. 6, 2006 (Mar. 6, 2006), pp. 491-495, XP058393584, ISBN: 9783981080100.
Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007), pp. 869-880, XP011187732, ISSN: 1063-8210, DOI: 10.1109/TVLSI.2007.900742.
Partha et al., Design, Synthesis, and Test of Networks on Chips, IEEE (Year: 2005).
Picornell Tomas Tompic@gap.upv.es et al: "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.
Srinivasan K et al, "Linear programming based techniques for synthesis of network-on-chip architectures", Computer Design: VLSI in Computers and Processors, 2004. ICCD 2004. Pr Oceedings. IEEE International Conference on San Jose, CA, USA Oct. 11-13, 2004, Piscataway, Nj, USA, IEEE, (Oct. 11, 2004), doi:10.1109/ICCD.2004.1347957, ISBN 978-0-7695-2231-9, pp. 422-429, XP010736641.
Srinivasan Murali et al: "Mapping and physical planning of networks-on-chip architectures with quality-of- service guarantees", Proceedings of the 2005 Asia and South Pacific Design Automation Conference, Jan. 18, 2005, DOI: 10.1145/1120725.1120737.
Tobias Bjerregaard et al: "A Router Architecture for Connection-Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.
Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.
Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.
Anonymous: "Network on a chip—Wikipedia", Jun. 15, 2021, https://en.wikipedia.org/w/index.php?title=Network_on_a_chip&oldid=1028654828.
Haytham Elmiligi et al: "Networks-on-chip topology optimization subject to power, delay, and reliability constraints", IEEE International Symposium on Circuits and Systems. May 30, 2010, pp. 2354-2357, DOI: 10.1109/ISCAS 2010.5537194.
Jain R. et al: "Predicting system level area and delay for pipelined and nonpipelined designs", IEEE Transactions on Computer Aided Design of Integrated Circuits and Systems, vol. 11, No. 8, Jan. 1, 1992, pp. 955-965, DOI: 10.1109/43.149767.
Jingye Xu et al: "Latch Based Interconnect Pipelining for High Speed Integrated Circuits", Proceedings of the International Conference on Electro/Information Technology, May 1, 2006, pp. 295-300, DOI: 10.1109/EIT.2006.252152.
Jun Minje et al: "Exploiting Implementation Diversity and Partial Connection of Routers in Application-Specific Network-on-Chip Topology Synthesis", IEEE Transactions on Computers, IEEE, USA, vol. 63, No. 6, Jun. 1, 2014 (Jun. 1, 2014), pp. 1434-1445, XP011550397, ISSN: 0018-9340, DOI: 10.1109/TC.2012.294.
Saponara S et al: "Design and coverage-driven verification of a novel network-interface IP macrocell for network-on-chip interconnects", Microprocessors and Microsystems, vol. 35, No. 6 , pp. 579-592, XP028255708, ISSN: 0141-9331, DOI: 10.1016/J.MICPRO.2011.06.005.
Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150, XP029678799, ISSN: 0141-9331, DOI: 10.1016/J.MICPRO.2016.04.008.
Song Z et al: "A NoC-Based High Performance Deadlock Avoidance Routing Algorithm", Computer and Computational Sciences, 2008. IMSCCS '08. International Multisymposiums on, IEEE, Piscataway, NJ, USA, Oct. 18, 2008, pp. 140-143, XP031411025, ISBN: 978-0-7695-3430-5.

* cited by examiner

| Traffic Load on the link | sigmoid function | Link Weight |
|---|---|---|
| 0.1 | 6.77241E-05 | 1.000067729 |
| 0.167 | 0.000338043 | 1.000338157 |
| 0.2 | 0.000746029 | 1.000746586 |
| 0.3 | 0.008162571 | 1.008229747 |
| 0.4 | 0.083172696 | 1.090717953 |
| 0.5 | 0.5 | 2 |
| 0.6 | 0.916827304 | 12.02317638 |
| 0.7 | 0.991837429 | 122.5104175 |
| 0.8 | 0.999253971 | 1340.430764 |
| 0.9 | 0.999932276 | 14765.78157 |
| 1 | 0.999993856 | 162755.7914 |

FIG. 3

SYSTEM AND METHOD TO DETERMINE OPTIMAL PATH(S) AND USE LOAD BALANCING IN AN INTERCONNECT

CROSS REFERENCE TO RELATED APPLICATION

This application is a continuation of U.S. application Ser. No. 16/845,056 filed Apr. 9, 2020 by Youcef BOURAI, et al and titled SYSTEM AND METHOD FOR SYNTHESIS OF A NETWORK-ON-CHIP TO DETERMINE OPTIMAL PATH WITH LOAD BALANCING, the entire disclosure of which is incorporated herein by reference.

FIELD OF THE INVENTION

The invention is in the field of system design and, more specifically, related topology synthesis for generating Network-on-Chip (NoC) network design used to handle communication between Intellectual Property (IP).

BACKGROUND

Intellectual Property (IP) blocks or elements or cores are used in chip design. The IP blocks represents a discrete component used in designing and building a system. Some IP blocks are masters. Some IP blocks are slaves. Masters and slaves communicate through a transport network, such as network-on-chip (NoC). Some NoCs are represented by a two-dimensional regular topologies, such as a mesh network, which include multiple links connecting multiple switches. In general, regular topologies, such as mesh networks, have the property of path/route diversity because it is possible to find multiple routes between a master and a slave through these networks. Routes define the path transactions that traverse from a Master to reach a slave. A slave is defined to be connected to a Master if it receives and sends transactions to that Master. The routes represent the traffic scenario envisioned for the network, such as the NoC. There will typically be many traffic scenarios, based on available routes, that define the use cases of the NoC. A traffic scenario is a list of minimum throughput requirements between each master and all slaves connected to that master. These routes have throughput restrictions or limitations. Throughput restrictions or requirements are expressed in amount of data that needs to be transferred per unit of time. Accordingly, routes between a master and connected slaves need to be selected in a such a way that the links between switches, which are located along the routes, are not overloaded and deadlock is avoided.

Therefore, what is needed is a system and method to find the best set of routes, from every master to every connected slave, in such a way that the links between the switches are not overloaded and deadlock is avoided, for all the traffic scenarios envisioned for the NoC.

SUMMARY OF THE INVENTION

In accordance with the various aspects of the invention, a system and method are provided that find the best set of routes or paths in a NoC, which are from a master to each of its connected slaves, for all the masters. More precisely, some embodiments of the invention apply to a class of NoCs that utilize regular topologies such as Mesh, Torus etc. topology. In such NoCs, a set of switches are arranged on a two-dimensional grid. Each switch is connected to a set of masters that inject traffic into the NoC. Each switch is also connected to a set of slaves that are servicing the traffic. In accordance with the embodiments of the invention, the NoC includes switches and links. The traffic advances from the master to the slave through various switches and links that form or represent routes. The traffic moves through selected routes in such a way that the links between the switches are not overloaded for any and all the traffic scenarios envisioned for the NoC. Additionally, the traffic moves in a way that avoids deadlock scenarios.

BRIEF DESCRIPTION OF THE DRAWINGS

In order to more fully understand the present invention, reference is made to the accompanying drawings. The invention is described in accordance with the aspects and embodiments in the following description with reference to the FIGs., in which like numbers represent the same or similar elements. Understanding that these drawings are not to be considered limitations in the scope of the invention, the presently described aspects and embodiments and the presently understood best mode of the invention are described with additional detail through use of the accompanying drawings.

FIG. 3 shows a table for the behavior of the weight of the links for a given set of rates (percentage) of the traffic load, in accordance with the various aspects of the invention.

DETAILED DESCRIPTION

Figure 1:
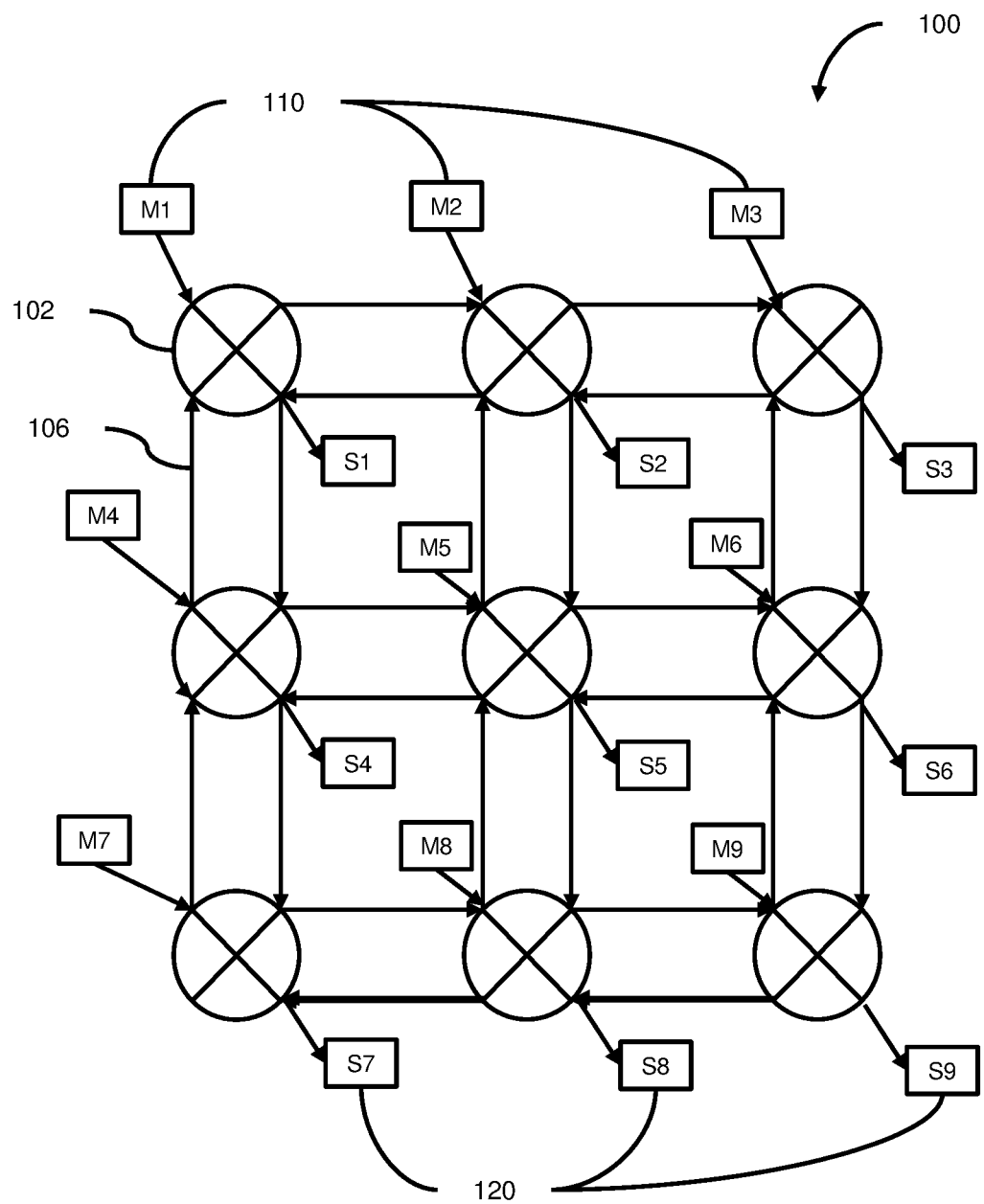
FIG. 1 shows a mesh type Network-on-chip (NoC) with switches and routes that handle communication between masters and slaves, in accordance with the various aspects of the invention.

Reference throughout this specification to "one embodiment," "an embodiment," or similar language means that a particular feature, structure, or characteristic described regarding the embodiment is included in at least one embodiment of the invention. Thus, appearances of the phrases "in one embodiment," "in an embodiment," "in certain embodiments," and similar language throughout this specification may, but do not necessarily, all refer to the same embodiment. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates, which may need to be independently confirmed.

Systems use an interconnect or a transport unit to manage communication between various IP cores or IP blocks. One example of a transport of interconnect is a Network-on-Chip (NoC). A NoC delivers messages between System-on-Chip (SoC) IPs, such as CPUs, memory, and memory controllers. The NoC includes interconnected switches, through which messages are steered or passed, and links. Links connect switches.

The term "router," "interconnect," and "transport unit" are used interchangeably herein. A transport unit implements the communication protocol or the decentralized logic behind the communication protocol that connects masters and slaves. A transport unit plays the role of transporting information. The transport unit receives packets sent on links or from links and, according to the address information in each packet, forwards the packet to the IP core attached to it or to another link and/or switch. The protocol includes a set of policies defined during the design (and implemented within the router) to handle transmission of a packet, such as avoiding deadlock, reducing the communication latency, increasing the throughput, etc. The logic connection between the network and IP cores is through a network adapter (NA) or a network interface unit (NIU).

The terms "IP core" and "IP unit" and "IP block" are used interchangeably herein. In accordance with some aspects and embodiments of the invention, some IP units are referred to herein as masters or initiators. In accordance with some other aspects and embodiments of the invention, some IP units are referred to as slaves or targets.

As used herein, the term "path" and "route" represent the combination of switches and links, which are defined between a master and a connected slave, through the network.

Referring now to FIG. 1, in accordance with various embodiments of the invention, a NoC 100 is shown. The NoC 100 includes various paths or routed that are represented by switches 102 connected through links 106. The size and speed of each switch depends on the following: 1) the logical parameters, such as the number of input/output ports and the data bus width; and 2) the physical conditions, such as process technology, type of the standard cell library, operating voltage and temperature. The NoC 100 is in communication with (or connected to) masters 110 (M1-M9) and slaves 120 (S1-S9). In accordance with the various embodiments of the invention, traffic is sent to the network from the masters 110 and the traffic is serviced by the slaves 120, all of which are connected to the NoC 100 at the switches 102. The switches 102 can have different performances. The switches 102 are connected through the links 106. In accordance with the various embodiments of the invention, the links 106 can have different bandwidths.

In order to prevent overload, the system can perform load balancing in a mesh-type NoC based on the various bandwidths associated with the routes connecting one master to its corresponding slave or slaves, which is referred to as a connected slave with respect to the master. The various routes, which connect the switches, along the path from one master to a connected slave are part of a mesh network. A routing algorithm, such as a pathfinder algorithm, is used to determine a path that will be used or followed by a packet that is traveling from the master (source) to the connected slave (destination).

An important aspect of the invention, which is considered while designing or selecting the fastest route, is avoiding a deadlock. A deadlock is a situation wherein no further transportation of packets can take place due to the saturation of network resources, such as routes/links or buffers. For example, a network might have four channels. Consider the situation when four packets have filled up the input buffers of the four channels. At some point, packets need to be forwarded to the next channel. If the output buffers of all these channels are also filled with packets that need to be transmitted to the next channel, then it is impossible to transmit packets any further because the output buffers and input buffers of all channels are already full. This is known as cyclic acquisition of channels and it results in a deadlock. Turn restriction routing is a routing algorithm for mesh-family of topologies that avoids deadlocks by restricting the types of turns that are allowed in the algorithm while determining the route from a source node (associated with a master) to a destination node (associated with a connected slave).

In accordance with some aspects and embodiment of the invention, the mesh-type NoC topology is defined using a set of scenarios. The scenarios describe all the traffics that the NoC or network will have to carry in terms of minimum throughput requirements. The scenarios are provided to the system in accordance with the various aspects of the invention. The system uses an adaptive deadlock free routing algorithm that provides the NoC with an optimized throughput and a minimum latency for all the scenarios. In accordance with an aspect of the invention, latency minimization is addressed by a shortest path paradigm. In accordance with an aspect of the invention, the optimized throughput is addressed by using load balancing on the links of the mesh-type NoC or network. In accordance with some aspects of the invention, the system uses a path finder algorithm instead of the classical Djikstra, which finds the shortest path between to nodes (or switches). The optimal path is determined based on a cost function in light of the bandwidth of the respective links being traversed by the packet of data. In accordance with the various aspects of the invention, the optimal path is defined based on the requirement that the traffic is always advancing through the NoC or network as the packet or data traffic moves from the master to the connected slave. The overall cost function that oversees the search of the path finder algorithm is defined as:

$$f=g+h,$$

where g is the cost of the path from the source (S) to the present position and h is the cost of the path from the present position to the target (T). The decomposition reduces the space of the search. As indicated, the traffic is advancing from the master to the slave as it travels through the network.

Figure 2:
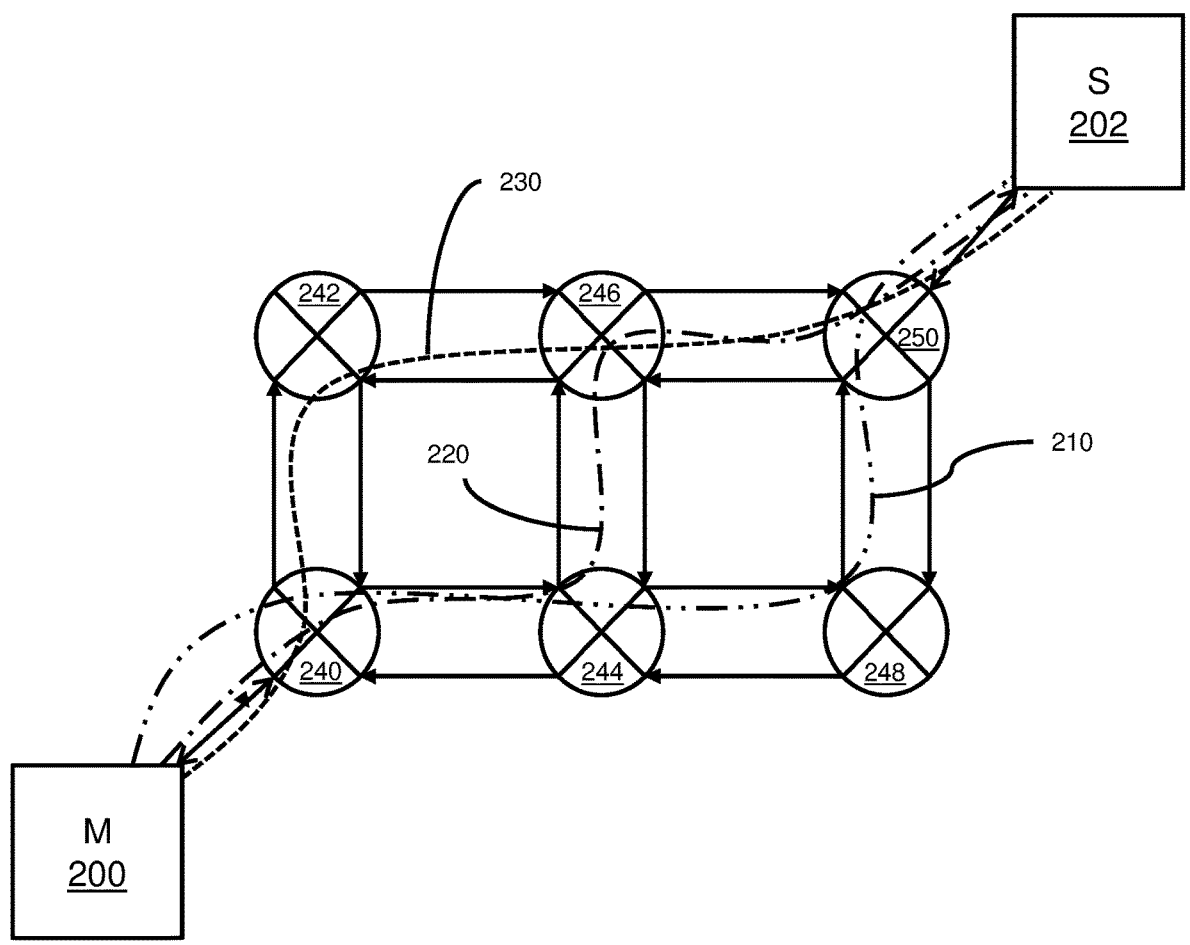
FIG. 2 shows a master in communication with a slave through a NoC, such as the NoC of FIG. 1, with multiple paths for traffic management, in accordance with the various aspects of the invention.

Referring now to FIG. 2, an initiator or master 200 and a target or slave 202 are shown in accordance with an embodiment of the invention. The master 200 and the slave 202 are connected through paths 210, 220, and 230. In accordance with one embodiment and aspect of the invention, each path has a different capacity or bandwidth. Path 210 travels through switches 240, 244, 248, and 250. Path 220 travels through switches 240, 244, 246, and 250. Path 230 travels through 240, 242, 246, and 250. In accordance with some aspects of the invention, paths 210 and 220 share links between the switches 240 and 244. The common path portion of paths 210 and 220, which is between switch 240 and 244, represents a different capacity or bandwidth. Traffic can travel along either path of the common path portion, using the link between the switch 240 and the switch 244. In accordance with some aspects of the invention, paths 220 and 230 share links between the switches 246 and 250. The common path portion of paths 220 and 230, which is between switch 246 and 250, represents a different capacity or bandwidth. Traffic can travel along either path of the common path portion, using the link between the switch 246 and the switch 250.

The system balances the traffic load between the various paths to avoid an overload situation. For example, data packets are sent from the master 200 to the slave 202 using any one of the paths 210, 220, and 230. Additionally, there are other packets traveling from different masters to different connected slaves, which may also travel through any one or more of the links that are part of the paths 210, 220, and/or 230. Thus, the overall traffic load of data packets, for the network, may use any one or combination of the paths 210, 220, and/or 230. The system sends data along any one or more of the paths 210, 220, and 230 based on the capacity to receive additional traffic without reaching an overload situation. Accordingly, the system determines the optimal balance of data packets traveling along each of the paths 210, 220, and/or 230.

The system distributes the load between the paths 210, 220, and 230. The load on any given path gradually increases, with respect to the capacity of each path, using a path finder algorithm with a sigmoid function. There are various approaches to gradually increasing and balance the traffic load on any given path. In accordance with one aspect of the invention, the system uses specific scheduling of data traveling along each path to balance the load. In accordance with various embodiments and aspects of the invention, the system gradually increases the data load on each path. The system identifies an optimal path between the master 200 and the connected slave 202 (or an initiator and its corresponding target). The optimal path traversed includes using various switched and links between the master 200 and the slave 202. For example, if the optimal path includes the paths 210, 220 and 230, then the system balances the load between the paths 210, 220 and 230.

To determine an optimal path, the system uses the path finder algorithm and the sigmoid function. The system tries to distribute the load, evenly, on the links to avoid congestion and, thus, optimize the throughput. The load is defined by the amount of data the link must be able to transfer per unit of time, as a part of this path. In accordance with various aspects of the invention, the system controls the load distribution using a sigmoid function. As shown in FIG. 3, the sigmoid function increases very slowly as depicted. The slowness of the function gives equal chance to every link to accept more load as if the links grow in the same time. In other words, the links share almost equally the loads to avoid congestion.

The weight on every link is define as:

$$linkWeight = \frac{1}{1-f}$$

Where:

$$f = 1/(1+e(k*X))$$

and where k is a constant. In accordance with one embodiment of the invention, the value of k is fixed at −1.3, and $$X = 2*linkLoad*10-10$$

Where "linkLoad" is the load that has been accumulated so far by the link during the path search. As indicated, the load on each link is gradually increased, relative to the link's capacity or bandwidth, in order to prevent an overload situation.

Referring now to FIG. 3, in accordance with some aspects and embodiments of the invention, the behavior of the weight of the links for a given set of rates (percentage) of the traffic load is shown. In accordance with some aspects of the invention, the path finder algorithm is illustrated in a routing algorithm. The routing algorithm, which is set forth below with the name FindRoute, shows how the sigmoid function is used to update the weight of the links to guide the search for an optimal path for each flow, as follows.

```
FindRoute(Flows, ArrayOfPath)
{
    // Flows: a set of flows as input
    // ArrayOfPaths: array of paths as output.
    //   Where each element is a path for each flow in Flows
    PriorityQueue Q;
    // flows in Q are ordered according to their latency
    Q←Flows;
    while ( Q != empty)
    {
        flowi = Q.extract( );
        pathi = PathFinder(flowi);
        UpadetBandWith(pathi);
        ArrayOfPath.insert(pathi);
    } /* end of while*/
    return;
}
UpdateBandWith(path)
{
    for_each (link ∈ payh)
    {
        newLoad = UpdateLink(link);
        f = SigmoidFunction(newLoad);
        link.weight = 1/(1-f);
    }
    return;
}l
```

Figure 4:
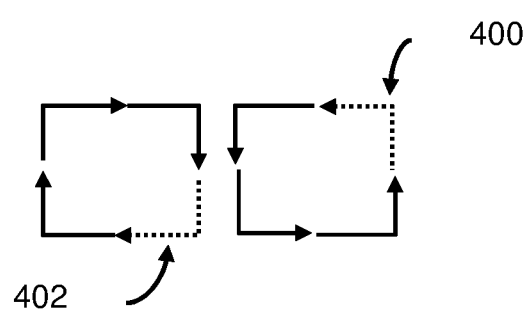
FIG. 4 shows a west first turning model that forbids two turns, in accordance with the various aspects and embodiments of the invention.

Referring now to FIG. 4, in accordance with one aspect of the invention, a deadlock is avoided by adopting a west first turning model that forbids two turns, turn 400 and turn 402.

Figure 5:
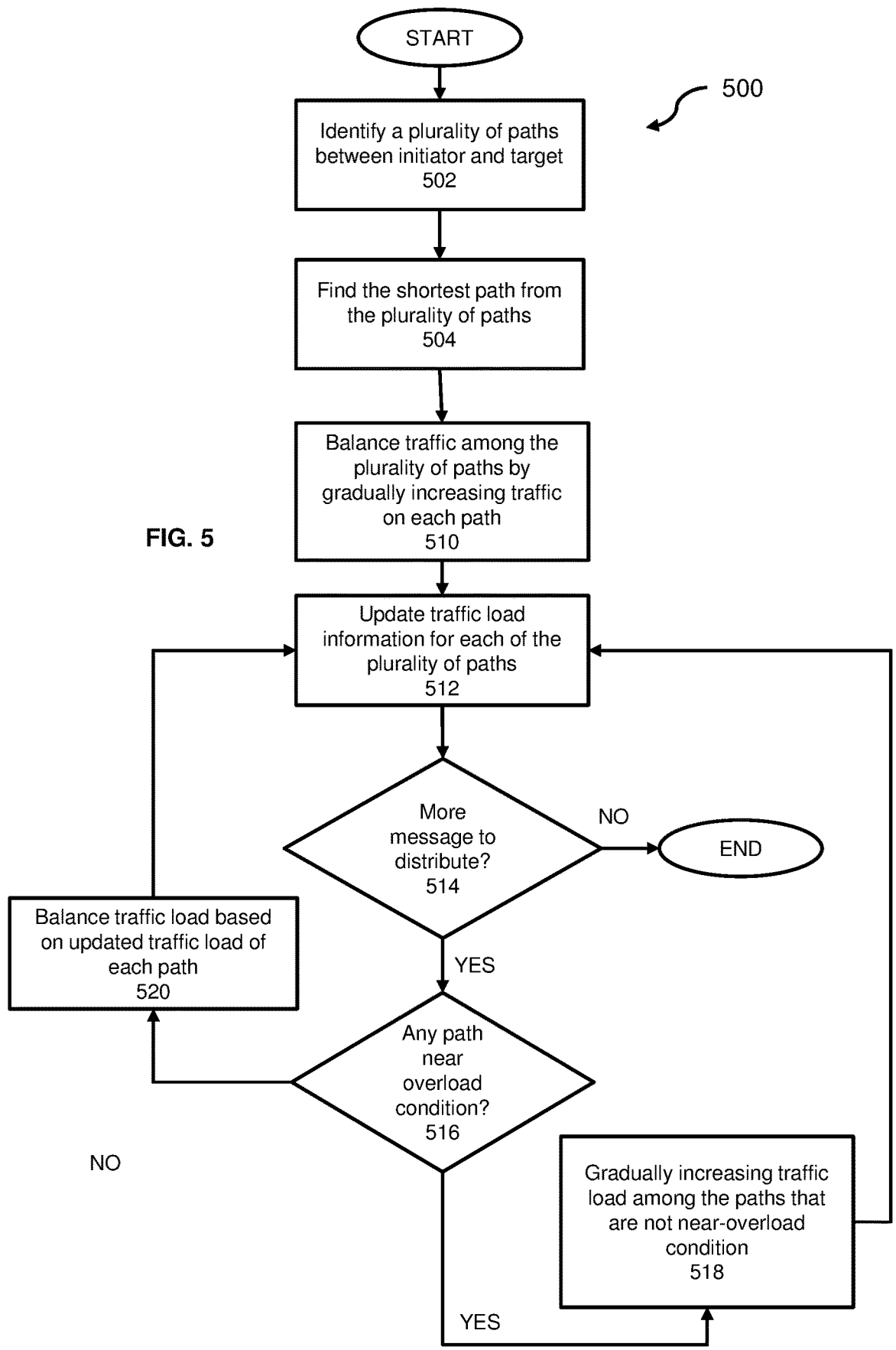
FIG. 5 shows a process for balancing traffic among paths, in accordance with the various aspects of the invention.

Referring now to FIG. 5, a process 500 is shown for load distribution among a plurality of paths in accordance with the various aspects and embodiments of the invention. At step 502, the system identifies a plurality of paths between initiators (masters) and target (slaves) that communicate using a Network-on-Chip (NoC). At step 504, the system determines a shortest path from the plurality of paths in accordance with the various aspects and embodiments of the invention. The shortest path is typically the lowest cost path in accordance with the various aspects and embodiments of the invention. The shortest path is typically the lowest delay path, in accordance with the various aspects and embodiments of the invention. Ideally, the traffic load travels along the shortest path. However, sending all the traffic along the shortest path would most like result in a traffic jam on the shortest path. Thus, in accordance with the various aspects and embodiments of the invention, the traffic is distributed and the traffic load is balanced among the various paths.

At step 510 the system balances traffic load among the plurality of paths by gradually increasing traffic load on each path. At step 512, the system analyzes the traffic load on each path and updates the traffic load information for each path. At step 514, the system determines if there are more messages to distribute. If not, then the process ends. If there are more messages to distribute, the process continues to step 516. At step 516, the system analyzes the traffic path load information to determine if any path is near overload condition. If so, then at step 518 the system continues to gradually distribute the traffic and balance the traffic load among the paths that are not near-overload condition. Then the process continues to step 512 to re-update the traffic load information based on the most recent (and updated) balancing and distribution of the traffic load. If at step 516 traffic does not need to be reassigned or distributed to different paths because the paths are not near-overload condition, then the process continues to step 520 and the traffic load is balanced and gradually distributed. The process continues to step 512 to update the traffic load distribution information for each path based on the most recent traffic load balancing and distribution. In accordance with some aspects of the invention, the traffic load conditions are constantly changing. Thus, while one path may be near-overload condition at one moment in time, that path may not be near-overload conditions at some later point in time. Thus, the path can again receive traffic load because its traffic load information is updated to indicate that the potential traffic jam or near-overload condition of that path no longer exists.

Figure 6:
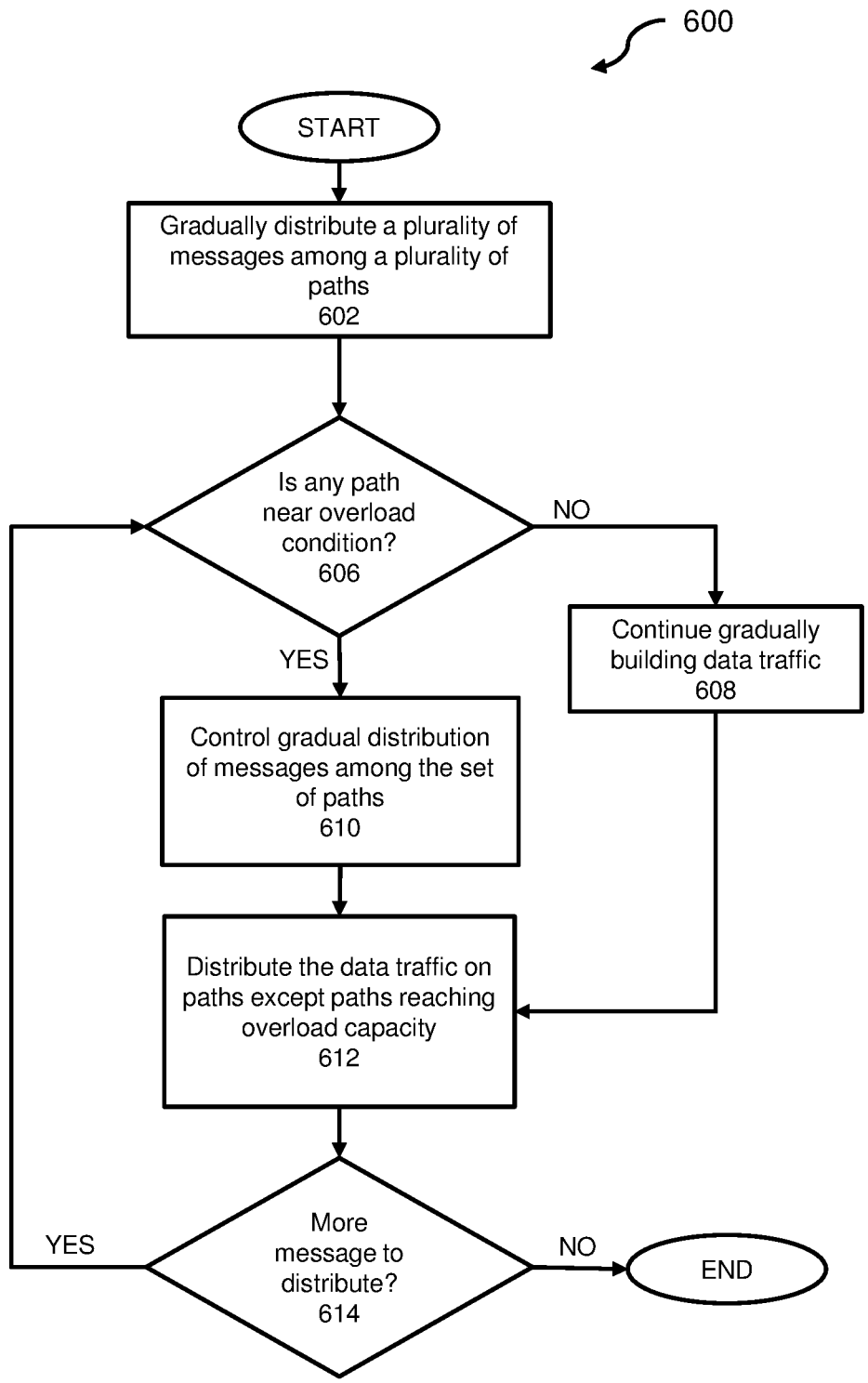
FIG. 6 shows a process for distributing messages among paths with load balancing, in accordance with the various aspects of the invention.

Referring now to FIG. 6, a process 600 is shown for distribution of traffic, which is in the form of data packets or messages, among multiple paths. At step 602, the system gradually distributes data packets or messages among a plurality of paths. The messages are gradually distributed among the paths to ensure there is load balancing and the traffic load increases gradually. For example, as discussed, above with respect to FIG. 3, the value of the sigmoid function for traffic on a link increases gradually until the traffic load for the link reaches 0.5. Then the sigmoid function increases rapidly as indicated by the link weight. Further, the paths are identified or selected to avoid deadlock. In accordance with various aspects of the invention, the system continues to distribute the messages that make up the traffic load by gradually building up the traffic on paths that can handle additional traffic load. The build-up is gradually increased to ensure that no one-path is overloaded, which delays or avoids traffic jams on overloaded paths. At step 606, the system determines, based on continued updated traffic load information for each path, if any path is near-overload, which could result in a traffic jam on that path. If not, then at step 608, the system continues to gradually increase traffic loads on the paths. This analysis is performed for each path being used for load balancing and traffic load distribution. If at step 606, the system determines that one path is nearing traffic overload conditions (near-overload), which may lead to a traffic jam, then at step 610 the system controls distribution or gradual distribution of messages among the paths. At step 610, in accordance with one aspect of the invention, the system controls distribution of the traffic, such as the messages or data packets, among the paths in such a way that the traffic load added to each path is even further reduced (even more gradual) or slowed down. At step 610, in accordance with some aspects of the invention, the system controls distribution of the load on the paths by selectively adding traffic load to paths based on the availability of each path's bandwidth. Further, the amount of traffic load added to any one path can be increased or decreased based on the rate at which the path recovers or moves the current traffic load it is handling. At step 612, any path that is near overload capacity or conditions, which may result in a traffic jam if additional traffic is distributed to that path, is skipped for traffic load distribution, in accordance with one aspect of the invention. Additional message packets or data packets are not received on the path, which is near-overload conditions, until the path's traffic load conditions are reduced. At step 614, if there are no more message or data packets to distribute, then the process ends. If there are more data packets to distribute, then the process continues to step 606.

Some embodiments of physical machines described and claimed herein are programmable in numerous variables, combinations of which provide essentially an infinite variety of operating behaviors. Some embodiments of hardware description language representations described and claimed herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines, such as semiconductor chips; hardware description language representations of the logical or functional behavior of machines according to the invention described and claimed; and one or more non-transitory computer readable media arranged to store such hardware description language representations all can embody machines described and claimed herein.

The behavior of either or a combination of humans and machines; instructions that, if executed by one or more computers, would cause the one or more computers to perform methods according to the invention described and claimed; and one or more non-transitory computer readable media arranged to store such instructions embody methods described and claimed herein. Each of more than one non-transitory computer readable medium needed to practice the invention described and claimed herein alone embodies the invention.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teachings of the invention, a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods. The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements, which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The scope of the invention, therefore, is not intended to be limited to the various aspects and embodiments discussed and described herein. Rather, the scope and spirit of invention is embodied by the appended claims.

What is claimed is:

1. A method for managing traffic loads between a plurality of IP blocks, the method comprising:
   identifying a plurality of paths for propagating messages using an interconnect between two IP blocks, wherein the two IP blocks are an initiator and a target;
   finding a least latency path from the initiator to the target, using a pathfinder module, from the plurality of paths between the initiator and the target, wherein the least latency path from the initiator to the target is at least one optimal path for traffic;
   balancing traffic loads among the plurality of paths by introducing gradual changes in traffic load on any one of the plurality of paths;
   updating traffic load for each path of the plurality of paths; and
   rebalancing traffic loads based on the updated traffic load of each path,
   wherein the traffic loads are gradually distributed based on available capacity of each path thereby preventing traffic overload on the optimal path, and
   wherein the pathfinder module uses a sigmoid function to update traffic load for each of the plurality of paths as traffic progresses toward the target to generate a plurality of updated paths with an updated traffic load for each of the plurality of updated paths.

2. The method of claim 1, wherein the least latency path is a shortest path from the initiator to the target.

3. The method of claim 1 further comprising balancing traffic loads among the plurality of updated paths.

4. The method of claim 1 further comprising reassigning traffic, when any one of the plurality of updated paths could result in an overloaded updated positive path with a potential traffic jam, intended for the overloaded updated positive path to at least one other updated path of the plurality of updated paths.

5. A system comprising:
   an initiator for generating requests;
   a target for generating responses, wherein the requests and the responses are traffic that include packets of data;
   an interconnect including a plurality of communication paths, which includes a least latency communication path between the initiator and the target, wherein the interconnect transports requests and responses between the initiator and the target, respectively, using the plurality of communication paths;
   memory for storing pathfinder code; and
   a processor in communication with the memory, the initiator, the target, and the interconnect, wherein the processor executes the pathfinder code to:
      identify, in the interconnect, a plurality of optimal communication paths between the initiator and the target from the plurality of communication paths, through which the traffic can travel, wherein the plurality of optimal communication paths includes the least latency communication path and the plurality of optimal communication paths are utilized to avoid a deadlock;
      balance traffic, through the interconnect, among the plurality of optimal communication paths by gradually increasing traffic on any one optimal communication path selected from the plurality of optimal communication paths thereby delaying a traffic overload on any one optimal communication path by gradually increasing traffic load on all of the plurality of optimal communication paths; and
      distribute traffic load among the plurality of optimal communication paths by gradually increasing traffic load on any given optimal communication path based on an updated communication path traffic load for each optimal communication path of the plurality of optimal communication paths and thereby avoiding a traffic overload on any optimal communication path.

6. The system of claim 5, wherein the least latency communication path is a shortest path for traffic traveling between the initiator and the target.

7. The system of claim 5, wherein balanced traffic reduces delay caused by traffic jams on any given optimal communication path selected from the plurality of optimal communication paths.

8. The system of claim 5, wherein traffic on each of the plurality of optimal communication paths is determined to generate the updated communication path traffic load for each of the plurality of optimal communication paths.

9. The system of claim 8 further comprising uniformly distributing traffic load among the plurality of optimal communication paths based on the updated communication path traffic load, such that only some optimal communication paths selected from the plurality of optimal communication paths receive additional traffic load based on the updated communication path traffic load.

10. A method for controlling traffic load, which includes a plurality of messages, distribution, the method comprising:
gradually distributing the plurality of messages among a set of paths selected from a plurality of paths in a mesh interconnect, in order to delay traffic jam on any one path selected from the set of paths;
controlling the gradual distribution of the plurality of message among the set of paths so that each path of the set of paths is utilized up to near-overloaded condition based on latency;
distributing the plurality of messages on any one path of the set of paths except any path of the set of paths that is reaching overload capacity due to higher latency in order to prevent the path from having a traffic jam;
updating traffic load for each path of the set of paths; and
rebalancing traffic loads based on the updated traffic load of each path, wherein the rebalancing of the traffic loads is a gradual distribution, using a sigmoid function, based on available capacity to maintain low latency of each path of the set of paths.

11. The method of claim 10, wherein the set of paths include a least latency path.

12. The method of claim 11, wherein the least latency path is determined by least distance.

13. The method of claim 10 further comprising uniformly distributing traffic load among the set of paths, such that only some paths selected from the set of paths receive additional traffic load.

14. The method of claim 10 further comprising reassigning traffic, when any one path of the set of paths could result in an overloaded updated positive path with a potential traffic jam, intended for the overloaded updated positive path to at least one other path of the set of paths.

* * * * *